(12) United States Patent
Schokking et al.

(10) Patent No.: US 8,577,872 B2
(45) Date of Patent: Nov. 5, 2013

(54) SELECTION OF PHOTOS BASED ON TAGGING HISTORY

(75) Inventors: Alexander Schokking, Seattle, WA (US); John M. Thornton, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 151 days.

(21) Appl. No.: 12/578,502

(22) Filed: Oct. 13, 2009

(65) Prior Publication Data
US 2011/0087674 A1  Apr. 14, 2011

(51) Int. Cl.
*G06F 17/30* (2006.01)

(52) U.S. Cl.
USPC ........................................... 707/722; 707/748

(58) Field of Classification Search
USPC .......................................................... 707/722
See application file for complete search history.

(56) References Cited

U.S. PATENT DOCUMENTS

| | | | |
|---|---|---|---|
| 7,188,153 B2 | 3/2007 | Lunt et al. | |
| 2007/0043688 A1 | 2/2007 | Kountz et al. | |
| 2008/0086458 A1 | 4/2008 | Robinson et al. | |
| 2008/0189336 A1 | 8/2008 | Prihodko | |
| 2009/0177744 A1 | 7/2009 | Marlow et al. | |
| 2009/0299990 A1* | 12/2009 | Setlur et al. | 707/5 |
| 2011/0078136 A1* | 3/2011 | Ronen et al. | 707/722 |

OTHER PUBLICATIONS

Golder, Scott A., "Measuring Social Networks with Digital Photograph Collections", Retrieved at<<http://www.hpl.hp.com/research/scl/papers/sna-photos/sna-photos-ht08-preprint.pdf>>, In the proceedings of the nineteenth ACM conference on Hypertext and hypermedia, 2008, pp. 5.

Farrell, et al., "Fringe Contacts: People-Tagging for the Enterprise", Retrieved at<<http://tlau.org/research/papers/www06-tagging-fc.pdf>>, in Proc. of the Collaborative Web Tagging Workshop at WWW2006, dated: 2006, pp. 5.

Perez, Sarah, "HP Researchers Design Intelligent Social Network with Focus on 'Real' Friends", Retrieved at<<http://www.readwriteweb.com/archives/hp_researchers_design_intelligent_social_network.php>> May 1, 2009, pp. 3.

Vojnovic, Milan, "Ranking and Suggesting Tags in Collaborative Tagging Applications", Retrieved at<<http://www.win.tue.nl/~marko/informs2007/abstracts/Milan%20Vojnovic/tagging-in-forms2007.pdf, Feb. 2007, pp. 1.

Mori, et al., "Extracting Keyphrases to Represent Relations in Social Networks from Web", Retrieved at<<http://www.aaai.org/Papers/IJCAI/2007/IJCAI07-453.pdf>> In the proceedings of IJCAI, 2007, pp. 2820-2825.

* cited by examiner

*Primary Examiner* — Rehana Perveen
*Assistant Examiner* — Alexander Khong

(57) ABSTRACT

Typical users may be interested in viewing photos of people with whom they maintain true social contact. In one example, a person's true social network may be inferred from photo tagging history. Social contacts tend to tag each other in photos, while other types of contacts (e.g., business contacts) are less likely to tag each other in photos. Thus, in order to determine what photos to show to a given user, people may be scored based on how often the user has tagged those people in photos, and also on how often those other people have tagged the user. Those people who have high scores may be presumed to be socially close to the given user. Photos containing people who have received high scores may be selected, and the selected photos may be shown to the user.

18 Claims, 5 Drawing Sheets

SELECTION OF PHOTOS BASED ON TAGGING HISTORY

BACKGROUND

On-line services are often used to store, organize, and share photos. In many contexts, such services have largely supplanted the use of paper photos and albums. Many types of on-line services offer photo management capabilities. For example, some web sites (e.g., Flickr) are geared toward photography enthusiasts. Other web sites (e.g., Facebook) are geared toward broader social networking applications, but do offer photo storage and management as one of their services.

In general, people may be interested in seeing photos of those who are in their true social network. Social networking sites allow people to declare who their "friends" are, and it might appear that a person's social network could be inferred by reading that person's list of "friends." However, the concept of a "friend" in a social networking site is often over-inclusive. People tend to list not only their true friends, but also their co-workers, distant relatives, etc. People may have varying degrees of interest in seeing photos of the people they list as friends.

In an effort to identify a person's social circle, some services might draw inferences from information related to e-mail. For example, it might be inferred that a given person is friends with someone who appears in his contacts list, or with whom that person corresponds frequently by e-mail. However, some e-mails are sent for social reasons, others for business reasons. Many of the people who appear in a given contacts list might be business acquaintances, and a person might more interested in seeing photos of his or her friends than of his or her business acquaintances. Thus, selecting photos to show to a user based on whom the user frequently e-mails may result in a selection of photos that is uninteresting to the user.

SUMMARY

In order to select photos that a user is interested in seeing, photos may be selected based on photo tagging history. People are likely to tag their true social contacts (e.g., friends and very close relatives) in photos, but are less likely to tag other people such as business acquaintances, distant relatives, former classmates, etc. Thus, the fact that people have tagged each other in photos may indicate that those people are members of the same social circle. Photos containing members of a user's true social circle may be selected, and those photos may be shown to the user.

In order to identify a user's true social circle, a set of photos is examined. The people in the photos are scored, where a higher score indicates a closer relationship to the user. For each photo in the set, if the user has tagged someone in that photo, the person's score is increased. Additionally, if someone else has tagged the user in the photo, then the person who did the tagging also receives an increase in score. Since people who are true social contacts may be more likely to tag each other than those who are not, the fact that the user tagged a person (or was tagged by a person) tends to suggest that the user and that person are true social contacts. People who receive high scores may be presumed to be social contacts of the user. Photos containing the people who received high scores may be selected, and those photos may be shown to the user. The set of selected photos may be pared down in various ways. For example, if a person with a high score appears in a photo, then the photo may be selected. However, if the photo also contains a large number of other people who are unknown to the user, then the photo may be de-selected, since the presence of a large number of unknown people may make the photo less interesting to the user.

There are various ways to show a photo to a user. For example, the photo could be shown as a slide show in a browser window or through a desktop widget. Or, as another example, photos could be selected and then sent to a network-enabled photo frame, so that a frame displayed in a person's house or office would show photos that have been determined to be of interest to a particular person.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
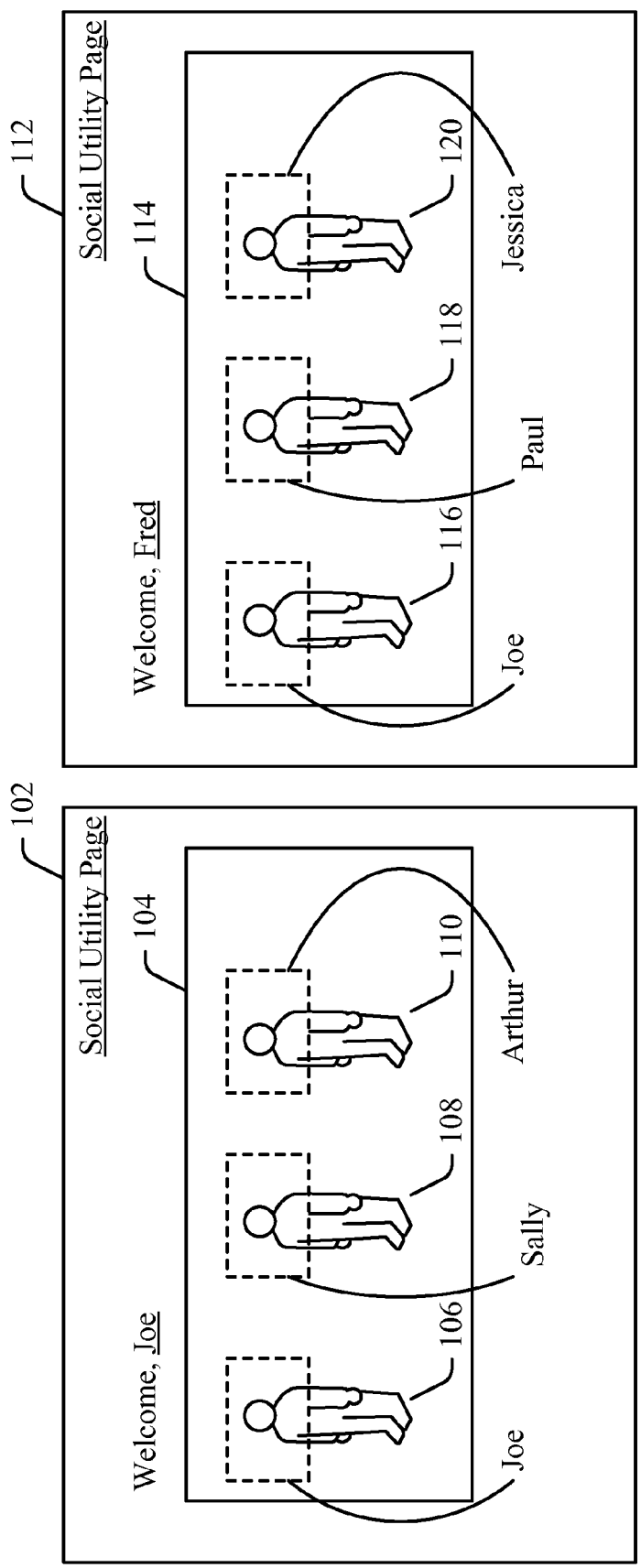
FIG. 1 is a block diagram of a web page of an example social utility.

On-line services have become a popular mechanism to store, organize, and share photos. People used to maintain albums and boxes of photographic prints. Now, it is more common to store images in digital form with an on-line service. There are various services that allow users to store photos. Some services are geared specifically toward photo sharing (e.g., Flickr, Photobucket), while others provide photo sharing and storage services as part of a larger social networking mechanism (e.g., Facebook, WINDOWS LIVE Spaces). One aspect of these services is that such services allow users to tag photos. A tag is metadata about the photo—e.g., the time it was taken, the place it was taken, the people who appear in the photo, etc.

Tags provide various types of information. Clearly, a tag that identifies a person in a photo provides information about who is in the photo. But tags also provide other types of information. A tag represents a human choice, exercised through the expenditure of human effort. Since people generally expend effort on things that matter to them, the fact that one person tags another person tends to indicate that these people are close social contacts. People generally tag their social contacts in photos, and—conversely—tend to be tagged by their social contacts. In other words, the pattern of who tags whom tends to reveal a person's social network.

Social networking sites generally support the concept "friends". People often declare "friend" relationships with others whom they know in various contexts—e.g., their business acquaintances, their former classmates, their relatives, and their true friends. However, these types of "friend" relationships are often over-inclusive in describing a person's true social network. A person may be willing to declare, on a social networking site, that a co-worker is a "friend". But the fact that two people have agreed to be "friends" on a social networking site may not reveal whether these two people have a true social relationship. By contrast, the fact that people tag each other in photos does tend to reveal something about a person's true social relationships. On a social networking web site, a person might list both his boss and his closest friend as "friends". However, it is more likely that the person would tag his best friend than his boss in a photo, so the person's tagging behavior reveals something about the person's true social network. Similarly, it is more likely that a person would be tagged by his best friend than by his boss, so again tagging behavior reveals something about the social network.

The subject matter described herein uses tagging behavior to determine a person's true social network, in order to select photos that people are likely to want to see. A person may want to see photos of people in his social network. Therefore, in determining which photos to show to a given person (e.g., "Joe"), a system could score people based on whether Joe has tagged those people in photos, and/or on whether those people have tagged Joe. Various other scoring criteria could be used, which are described below. Photos that contain people with high scores could be shown to Joe in various contexts. For example, an on-line album of photos could be created and made available to Joe. Or, a slideshow of the photos could be shown in a widget on Joe's computer desktop. Or, as another example, the selected photos could be sent to a network-enabled photo frame in Joe's living room.

Turning now to the drawings, FIG. 1 shows the web page of an example social utility. A social utility may, for example, take the form of a social networking web site, such as Facebook, MySpace, Live Spaces, etc. The social utility shown in FIG. 1 may be used to perform various functions, such as verbal communication, and the sharing of photos and videos. When the social utility is used to share photos, a user may upload his or her own photos to the social utility, and (under some circumstances) may view the photos of other users. A user may also tag photos to indicate, among other things, which people appear in the photos. Users may tag their own photos, and (under some circumstances) may tag photos of other users.

In the example of FIG. 1, it is assumed that there is a user named "Joe." Screen 102 shows a web page that might be presented by the social utility when Joe is logged in. In screen 102, Joe is viewing a photo 104. Photo 104 may be a photo that Joe has uploaded, or may be a photo that another user has uploaded. Joe may tag the photo in various ways. For example, Joe may indicate the name of the city where the photo was taken, or may indicate the date on which it was taken, or may add some type of free form notes. However, one type of tagging that Joe may do is to identify the people who appear in the photo. On many social utilities and photo sharing services, the user interface allows a user to place a rectangle around a region of the photo, and to identify the person who appears in the region. In the example of FIG. 1, three people 106, 108, and 110 appear in photo 104, and Joe has identified these people as himself (i.e., "Joe"), as well as two other people named "Sally", and "Arthur".

Fred is another user of the social utility. Screen 112 shows a web page that the social utility might present when Fred is logged in. In screen 112, Fred is shown a photo 114, in which three people 116, 118, and 120 appear. Photo 114 may be a photo that Fred has uploaded, or may be a photo that any other user has uploaded. Fred may use the social utility's tagging mechanism to identify people 116, 118, and 120 as "Joe", "Paul", and "Jessica", respectively.

If one wants to determine who is in Joe's true social network, various conclusions may be drawn from the tagging behavior depicted in FIG. 1. For example, the fact that Joe has tagged Sally and Arthur may indicate that Sally and Arthur are true social contacts of Joe. Also, the fact that Fred has tagged Joe in a photo may indicate that Fred is also a social contact of Joe. The fact that Fred has tagged Paul and Jessica may also indicate that Paul and Jessica are social contacts of Fred (although this fact does not indicate, one way or the other, whether Paul and Jessica are social contacts of Joe).

One could make the assumption that people tend to tag (and be tagged by) their true social contacts. One could also make the assumption that people tend not to tag (and tend not to be tagged by) people they know only from a non-social context (e.g., people who know each other only as co-workers). Such broad assumptions are unlikely to completely explain a person's tagging behavior, and there certainly could be individual counterexamples. However, these assumptions suggest a reasonable heuristic that allows a person's true social network to be derived from users' tagging behavior with some accuracy. In particular, in order to determine who is in A's true social network, one can look at a set of photos and determine (a) whom A has tagged in these photos, and (b) who has tagged A in these photos. These instances, and possibly some other considerations that are described below, may be used to assign scores to the question of "how close a social contact is A to X," where X is a member of some set of people.

Figure 2:
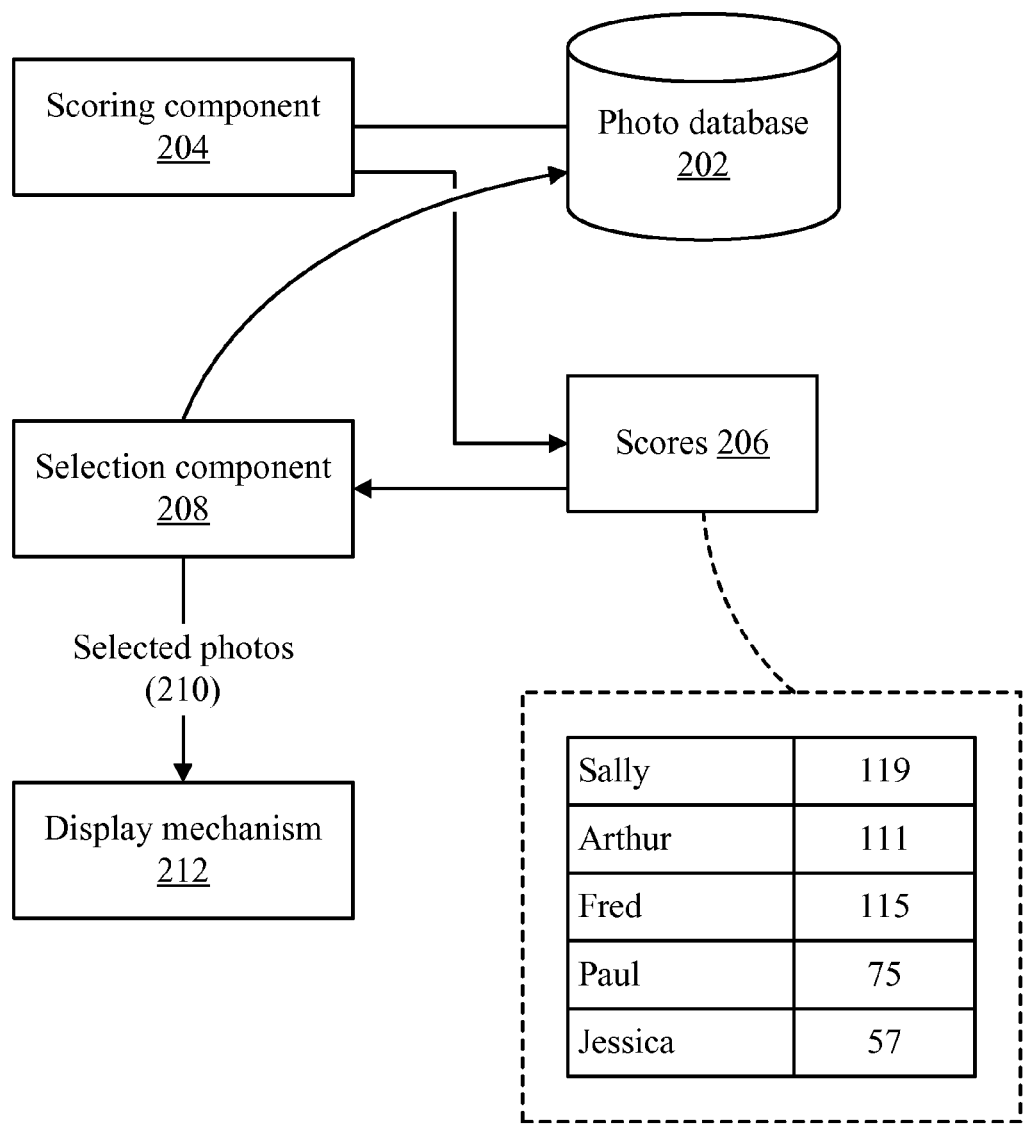
FIG. 2 is a block diagram of an example scenario in which a scoring process may be used to quantify social relationships.

FIG. 2 shows an example scenario in which such a scoring process may take place. Photo database 202 is a database that is configured to contain (and that also may actually contain) a collection of tagged photos, such as photos 104 and 114 (shown in FIG. 1). Scoring component 204 generates scores 206 that quantify how close, socially, the various people tagged in the photos are to a given person. For example, scoring component 204 may determine how close various people are to Joe. In order to determine Joe's social network, scoring component 204 may generate, for each person tagged in the photos (other than Joe himself) a score indicating how close a social contact of Joe's that person is. Scores 206 may, for example, take the form of the table shown in within the dashed boundary. In this table, Sally has a score of 119, Arthur has a score of 111, Fred has a score of 115, Paul has a score of 75, and Jessica has a score of 57. These scores might be derived, for example, by counting the number of times that Joe tags the people listed in the score table, and how many times those people have tagged Joe (although it is noted that scoring component 204 is not limited to any particular scoring algorithm).

Once scores have been calculated for the various people tagged in the photos contained in photo database 202, these scores may be used to select the particular photos that are to be shown to a person. Selection component 208 may use scores 206 to identify—based on Joe's true social network—which people Joe might want to see in photos. Selection component 208 may then retrieve photos containing those people (or some subset of the photos containing those people) from photo database 202. Once selection component 208 has selected photos based on the above-described considerations, the selected photos 210 may be provided to display mechanism 212 so that the photos may be shown to Joe. Display mechanism 212 could take any form. For example, display mechanism 212 could be a web page displayed by a browser on Joe's computer (e.g., a slide show of photos in a browser window), or could be a widget on Joe's desktop (e.g., a widget that displays a slide show), or a standalone photo frame such as that described below in connection with FIG. 4, or any other appropriate mechanism.

Figure 3:
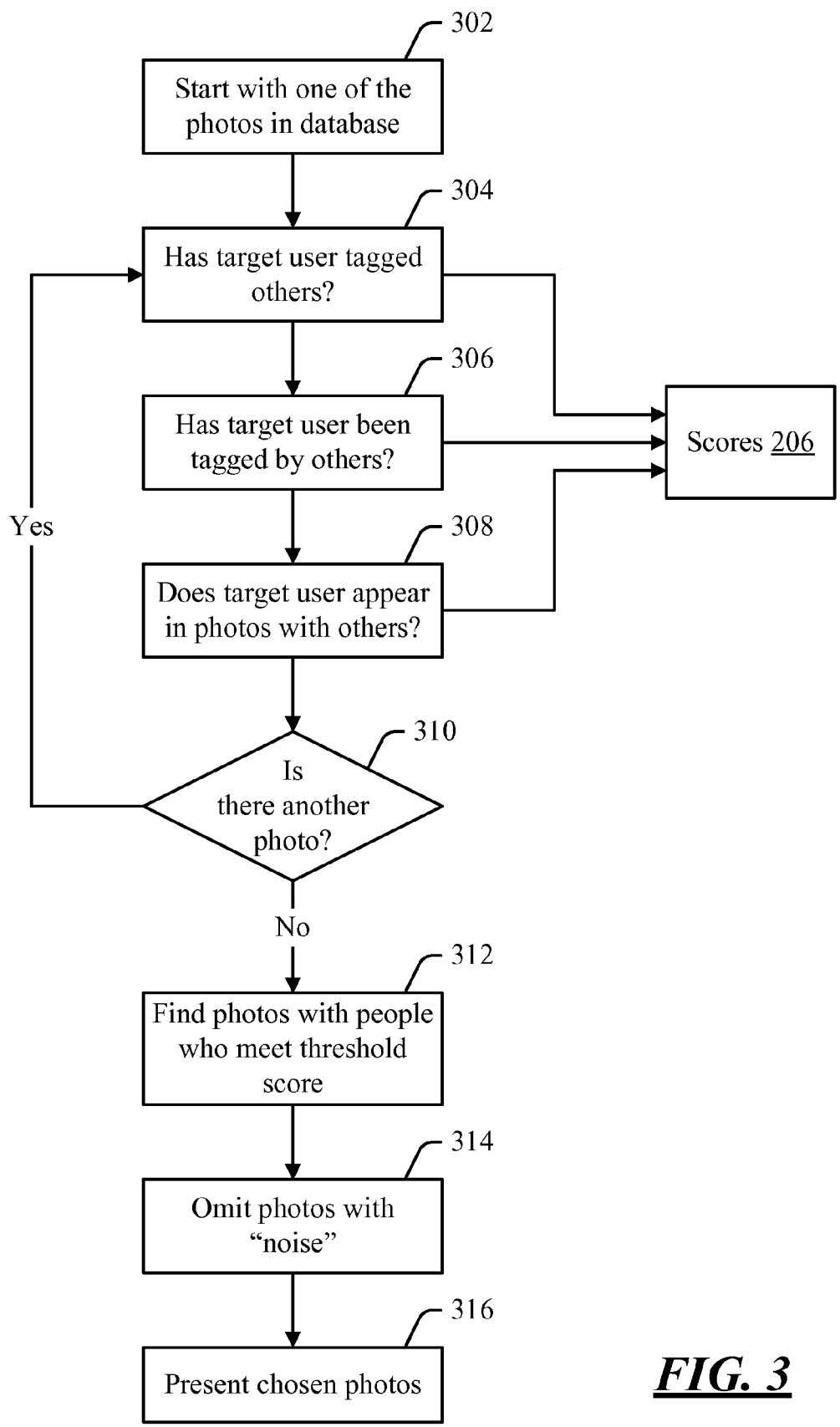
FIG. 3 is a flow diagram of an example process in which photos may be selected and shown to a user.

FIG. 3 shows an example process in which photos may be selected and shown to a user. Before turning to a description of FIG. 3, it is noted that the flow diagram of FIG. 3 is described, by way of example, with reference to components shown in FIGS. 1 and 2, although this process may be carried out in any system and is not limited to the scenarios shown in FIGS. 1 and 2. Additionally, the flow diagram in FIG. 3 shows an example in which stages of a process are carried out in a particular order, as indicated by the lines connecting the blocks, but the various stages shown in this diagram can be performed in any order, or in any combination or sub-combination.

The process of FIG. 3 may examine each photo in a database to determine how close a social relationship a given person (e.g., Joe) has with the people who appear in the photos. The person whose relationship to others is being analyzed is referred to in the flow diagram as the "target" person. (In this example, the target person is Joe, since the process attempts to determine how close a social relationship Joe has with other people in the photos). In order to examine these photos, at 302, the process starts with one of the photos in the database. The photo that is currently being considered by the process of FIG. 3 may be referred to as the "current" photo. It is then determined (at 304) whether the target person has tagged other people in the photos. If the target person has tagged other people in the photo, then the scores of those other people are increased. For example, if Joe has tagged Arthur and Sally in the photo that is being examined, then this fact tends to indicate that Joe may have a social relationship with Arthur and Sally, and this fact is used to increase Arthur's and Sally's score entries in the set of scores 206. (Scores may "increased" or "decreased" relative to some starting value. For example, at the start of the process of FIG. 3, each person might start with a score of 50, and a person's scores could be adjusted upward or downward depending on the tagging behavior revealed from an examination of photos in the database. Of course, the foregoing is merely one way of tabulating scores; scores could be assigned to people in any appropriate manner.)

At 306, it is determined whether the current photo contains a tag of Joe, which has been applied by some other person. For example, if Joe is tagged in the photo, and if that tag was applied by a user named "Tom," then this fact tends to indicate that Tom may be part of Joe's true social network. Thus, if Tom has tagged Joe in the current photo, then Tom's entry in the set of scores 206 may be increased.

At 308, it is determined whether the current photo shows the target person with other people. For example, if the current photo shows Joe along with two users named Eric and Josh, then this fact may be used to increase Eric and Josh's score entries in the set of scores 206, on the theory that the fact Joe appears in a picture with Eric and Josh may indicate that Eric and Josh are true social contacts of Joes. Of course, the target person might appear in photos with people who are not the target person's true social contacts, but this possibility could be addressed through score weighting. For example, if Joe tags person A, or is tagged by person A, then person A's score might increase by ten points. On the other hand, if Joe merely appears in a photo with person A, then this fact might increase person A's score by five points. As noted above, the subject matter herein is not limited to any particular scoring technique. A goal of the process of FIG. 3 is to use facts related to photo tagging to determine how close a social relationship the target person has with others. Some facts may correlate with the existence of a social relationship more strongly than others. Various techniques (such as the weighting technique mentioned above) may be used to take into account how strongly a fact correlates with the existence of a social relationship between the target person and another person, and thus how much (or how little) a given fact is to increase (or decrease) that other person's score.

At 310, it is determined whether there is another photo in the database. If so, then the next photo in the database becomes the current photo, and the process returns to 304 to consider the next photo in the database. If there is not another photo in the database, then the process continues to 312, where photos are selected based on the scores.

At 312, photos are found that contain people who have met some score threshold. The score threshold could be determined in any manner. For example, there could be a constant value that represents the score cutoff (e.g., people could be considered to be in Joe's social network if their final score is zero or more, 100 or more, etc.). Or, the threshold could be determined algorithmically (e.g., the threshold could be set to the average score among the people who appear in the set of photos in the database). Thus, at 312, a set of photos could be selected, such that any photo in the set contains at least one person who satisfies the score threshold.

At 314, "noisy" photos may be omitted. For example, suppose that Sally receives a score that satisfies the threshold, thereby indicating that Sally is probably in Joe's true social network. Sally might appear alone in one photo. She also might appear in a group photo that contains Sally along with one hundred other people. Both photos would be selected initially, since both photos meet the criteria of containing at least one person who received a score that exceeds the threshold. However, the second photo may be of considerably less interest to Joe, since the person he may be interested in (i.e., Sally) is obscured by one hundred people whom Joe may not be interested in. Such a photo may be described as "noisy" in the sense that the non-interesting part of the photo obscures the interesting part (at least in terms of what is interesting from Joe's perspective). Such noisy photos could be omitted from the set of selected photos at 314. (Noisy photos could be omitted by removing them from the selected set after they have been added to the selected set. Alternatively, a system could omit noisy photos by initially avoiding selection of such photos.)

At 316, the selected photos may be presented. The selected photos could be shown in a tangible form, such as showing the photos as slide show in a browser window or desktop widget, by a standalone photo frame, or by some other mechanism.

Figure 4:
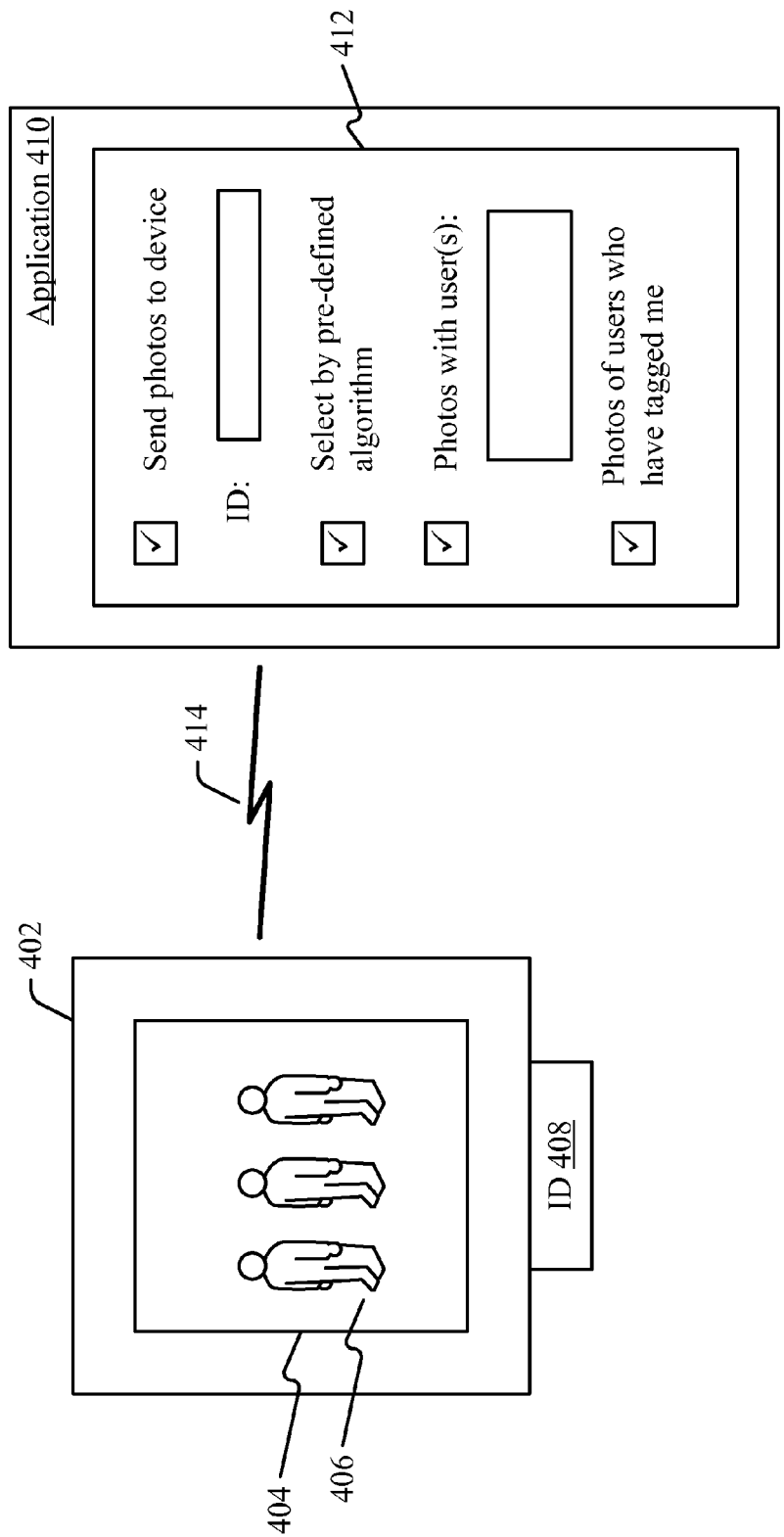
FIG. 4 is a block diagram of an example scenario in which a photo frame is used to display photos.

As noted above, various mechanisms may be used to display selected photos to a user. One example mechanism to display photos to a user is a standalone photo frame, such as an electronic device that some people use to display digital photos in place of displaying framed paper photos. FIG. 4 shows an example in which a photo frame is used to display photos.

Photo frame 402 may comprise a screen 404 on which photos (such as photo 406) are displayed. Photo frame 402 may also comprise a mechanism to receive a set of one or more photos, and may use screen 404 to show various different photos from the set. For example, photo frame 402 may cycle through a collection of photos, and may periodically change the photo in the frame.

Some photo frames receive photos through a flash memory such as a Secure Digital (SD) card or Universal Serial Bus (USB) flash drive. In the example of FIG. 4, photo frame 402's mechanism to receive photos is a WiFi connection. Photo frame 402 may comprise a network identifier (ID) 408, which allows photo frame 402 to be addressable in a computer network. Thus, a user could use a computer to cause photos to be selected and sent to photo frame 402.

Application 410 is an example of an application that might run on a computer in order to select and send photos to photo frame 402. Application 410 provides a user interface 412 that allows a user to determine how photos are to be selected, and where they are to be sent. For example, user interface 412, as shown, might provide a check box that allows the user to choose to send photos to a particular device. User interface 412 might also provide a box into which a user could enter the ID of the device to which the photos are to be sent (e.g., ID 408). Thus, a computer could use a network (including the WiFi connection indicated by jagged line 414) in order to transmit photos to the specified device.

In addition to allowing a user to specify a device to which photos are to be sent, user interface 412 could also allow a user to specify the manner in which photos are to be selected. For example, user interface 412 could include a check box that allows photos to be selected by some pre-determined algorithm. One such algorithm is the above-described technique in which scores are calculated to determine how close a relationship one use has with other users, selecting photos that contain photos whose scores exceed some threshold, and then possibly removing noisy photos. However, other algorithms could be used.

User interface 412 might also provide the user with the option to specify explicitly whom the user would like to see photos of. For example, a user could specify that photos are to be selected that contain specific users. Or, in another example, a user could specify that photos are to be selected that contain people who have tagged the user. (E.g., if Joe is using user interface 412 to specify which photos he would like to see, he could check the box that states "photos of users who tagged me", indicating that Joe would like to see photos of users who were interested enough in Joe to tag Joe in photos.)

Figure 5:
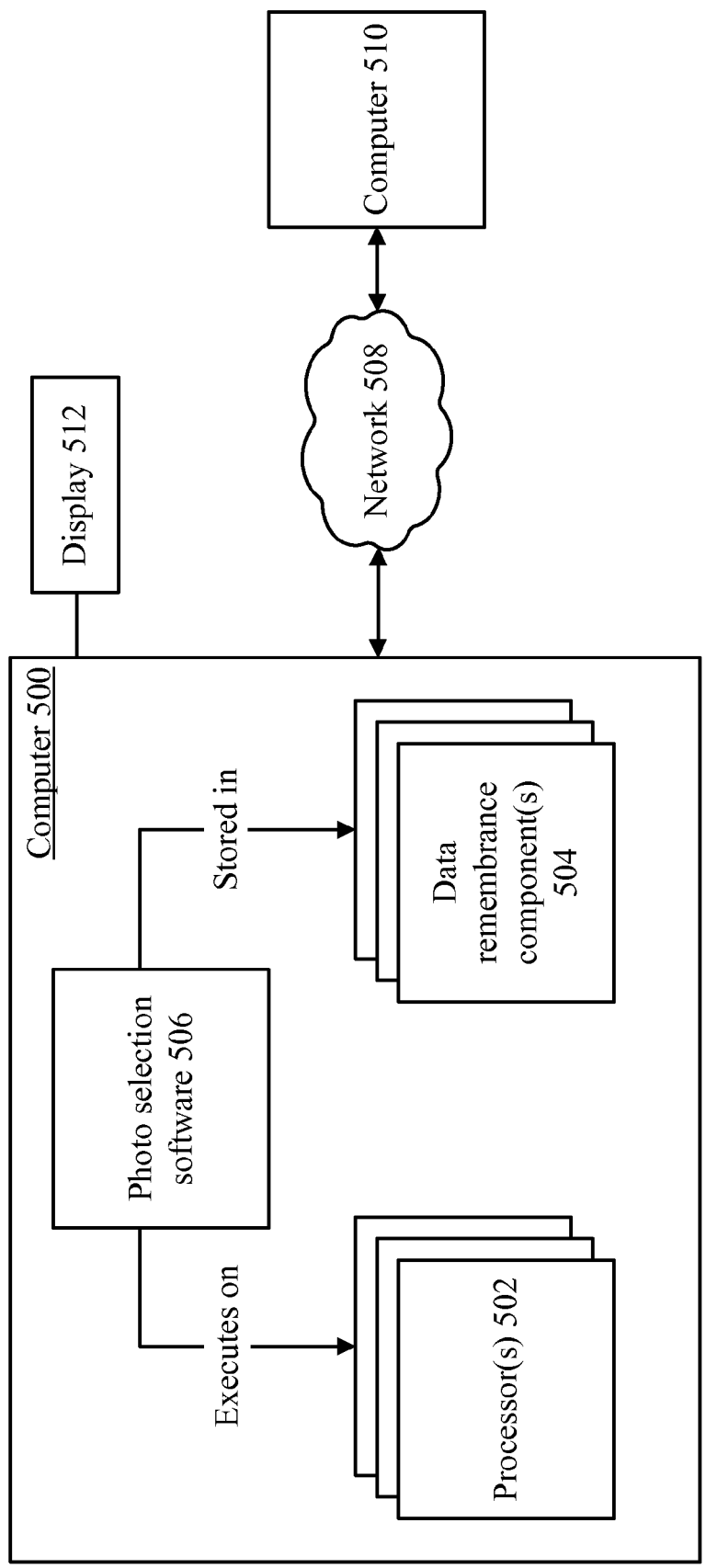
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is photo selection software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. (Tangible media, such as an optical disks or magnetic disks, are examples of storage media.) Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media that store executable instructions to select photos, wherein the executable instructions, when executed by a computer, cause the computer to perform acts comprising:
   for each photo in a database configured to contain a plurality of photos:
      determining whether a user has tagged a first person in said photo;
      determining whether said user has been tagged in said photo by said first person; and
      increasing a score associated with said first person based on whether said user has tagged said first person in said photo, based on whether said user has been tagged by said first person in said photo, or based on whether said user and said first person appear in a photo together, and said score increasing by a greater amount for said user's tagging, or being tagged by, said first person than for said user's appearing in said photo with said first person;
   identifying a first set of people that comprises the people in said photos whose score exceeds a threshold;
   selecting a second set of said photos, wherein each photo in said second set is selected based on the fact that said photo contains a person from said first set of people; and
   displaying said second set of photos.

2. The one or more computer-readable storage media of claim 1, wherein said acts further comprise:
   removing a first photo from said second set based on said photo including a person who is not in said first set.

3. The one or more computer-readable storage media of claim 1, wherein said acts further comprise:
   removing a first photo from said second set based on how many people appear in said first photo but are not in said first set.

4. The one or more computer-readable storage media of claim 1, wherein said displaying of said second set of photos comprises:
  displaying said second set of photos in a browser window on a computer of said user.

5. The one or more computer-readable storage media of claim 1, wherein said displaying of said second set of photos comprises:
  displaying said second set of photos in a widget on a desktop of a computer of said user.

6. The one or more computer-readable storage media of claim 1, wherein said displaying of said second set of photos comprises:
  transmitting said second set of photos to a standalone photo frame device.

7. The one or more computer-readable storage media of claim 6, wherein said user uses a computer to specify how photos are to be selected for inclusion in said second set, and wherein said photos are transmitted to said standalone photo frame device via a computer network to which said standalone photo frame device and said computer are communicatively connected.

8. A method of identifying a social network of a first person, the method comprising:
  using a processor to perform acts comprising:
    for each photo in a database that contains a plurality of photos:
      determining whether said first person has tagged a second person in said photo;
      determining whether said first person has been tagged in said photo by said second person; and
      increasing a score associated with said second person based on whether said first person has tagged said second person in said photo, based on whether said first person has been tagged by said second person in said photo, or based on whether said first person and said second person appear in a photo together, and said score increasing by a greater amount for said first person's tagging, or being tagged by, said second person than for said first person's appearing in said photo with said second person;
    identifying a social network of said first person, such that said social network comprises people in said photos whose score exceeds a threshold;
    selecting a set of photos such that each photo in said set shows a person who is in said social network and whose score exceeds said threshold, each photo in said set having been chosen based on a fact that said photos contain a person in said social network whose score exceeds said threshold; and
    presenting said set of photos to said first person in a tangible form.

9. The method of claim 8, wherein said acts further comprise:
  removing a first photo from said set based on said photo including a person who is not in said social network.

10. The method of claim 8, wherein said acts further comprise:
  removing a first photo from said set based on how many people appear in said first photo but are not in said social network.

11. The method of claim 8, wherein said presenting of said set of photos comprises:
  displaying said set of photos in a browser window on a computer of said first person.

12. The method of claim 8, wherein said presenting of said set of photos comprises:
  displaying said set of photos in a widget on a desktop of a computer of said first person.

13. The method of claim 8, wherein said presenting of said set of photos comprises:
  transmitting said set of photos to a standalone photo frame device.

14. The method of claim 13, wherein said first person uses a computer to specify how photos are to be selected for inclusion in said set, and wherein said photos are transmitted to said standalone photo frame device via a computer network to which said standalone photo frame device and said computer are communicatively connected.

15. A system to display photos, the system comprising:
  a processor;
  a data remembrance component;
  a photo selection component configured to be stored in said data remembrance component and that executes on said processor, wherein said photo selection component assigns scores to people based on which of said people have been tagged in a first set of photos by a first person, based on which of said people have tagged said first person in said first set of photos, and based on which of said people appear in said first set of photos with said first person, and said scores increasing more for said people tagging, and being tagged by, said first person than for said people appearing in said first set of photos with said first person, said photo selection component selecting a second set of photos from among said first set of photos based on which photos in said first set of photos contain people whose scores exceed a threshold; and
  a photo display device configured to be communicatively connected to a computer on which said photo selection component executes, said photo display device receiving said second set of photos through a network, said photo display device displaying photos in said second set.

16. The system of claim 15, wherein said photo display device is connected to said computer through a WiFi connection.

17. The system of claim 15, wherein said photo selection component removes a first photo from said second set, or avoids including a first photo in said second set, based on whether said first photo contains (a) a person whose score does not exceed said threshold, or (b) a number of people whose scores do not exceed said threshold.

18. The system of claim 15, wherein said photo selection component provides a user interface through which said first person identifies the photo display device to which said second set of photos is to be sent, and through which said first person specifies how photos to be displayed are to be selected.

* * * * *